United States Patent [19]

Boyd et al.

[11] Patent Number: 5,229,976
[45] Date of Patent: Jul. 20, 1993

[54] METHOD FOR CREATING A NUMERICAL MODEL OF THE PHYSICAL PROPERTIES WITHIN THE EARTH

[75] Inventors: Mark Boyd; Douglas W. Hanson, both of Ponca City, Okla.

[73] Assignee: Conoco Inc., Ponca City, Okla.

[21] Appl. No.: 788,406

[22] Filed: Nov. 6, 1991

[51] Int. Cl.⁵ .............................................. G01V 1/28
[52] U.S. Cl. ...................................................... 367/73
[58] Field of Search ............................... 367/73, 50, 38

[56] References Cited

U.S. PATENT DOCUMENTS

| | | | |
|---|---|---|---|
| 4,330,873 | 5/1982 | Peterson | 367/60 |
| 4,415,999 | 11/1983 | Moeckel et al. | 367/73 |
| 4,633,402 | 12/1986 | Flinchbaugh | 364/421 |
| 4,679,174 | 7/1987 | Gelfand | 367/73 |
| 4,747,054 | 5/1988 | Chittineni | 364/421 |
| 4,766,574 | 8/1988 | Whitmore, Jr. et al. | 367/50 |
| 4,821,242 | 4/1989 | Hennington | 367/53 |

*Primary Examiner*—Ian J. Lobo

[57] ABSTRACT

A method of translating a drawn or imagined model into a numerical format. Working from a paper sketch or interpreted seismic display, the geological horizons and faults are digitized in any order. If the horizon is unbroken, it is digitized continuously as one piece, if it is broken by faulting, it is digitized as a series of elements. Digitizing ceases if the horizon terminates within the model. During preconditioning the boundaries of the model are added as another element. A search is performed and if intersecting elements are found, the shortest limb is deleted. A second search locates elements which do not terminate at an intersection. If the element is from a horizon, it is projected until it intersects another element, if an unconnected fault element, the element is deleted back to its first intersection point. The first phase of cell construction identifies segments which connect only to themselves and produces single segment cells. Remaining segments are used to construct cell units in a clockwise direction by determining the angles made between the final pair of points in the active segment and the first two points on all connecting segments, selecting the segment with the largest angle to continue building the cell. This process is repeated until the starting segment is again encountered. Physical properties are assigned to each cell. The cells are automatically split into microcells defining volumes of space with simply varying properties when the cell properties are convoluted.

15 Claims, 4 Drawing Sheets

METHOD FOR CREATING A NUMERICAL MODEL OF THE PHYSICAL PROPERTIES WITHIN THE EARTH

BACKGROUND OF THE INVENTION

1. Field of the Invention

The present invention pertains to providing two dimensional models of the subsurface physical properties of the earth and more particularly to a method for translating a drawn or imaged model into a numerical format for use in computer calculations.

2. Related Prior Art

Numerical models of rock properties such as velocity are widely used by geophysicists to generate synthetic seismic data and perform seismic image reconstruction.

There are practical problems concerning how a layered earth model can be specified to ensure that no ambiguity exists. Since the model is created for the purpose of numerical calculation, this also introduces practical constraints on how the model must be constructed. The traditional solution has been to set strict rules governing the interface data used to construct the model and the order in which it is input.

There are several commercially available seismic modeling software packages, all of which include a model building element. One choice that is typical in its approach to model building is representing the model as a series of layered interfaces. It achieves the same end as the present invention However, to ensure that there is no ambiguity and for numerical expediency, this system requires that layers be entered in strict sequence, that each layer extends across the entire model and that fictitious layers are needed to create overhanging structures. To comply, the user must enter artificial interface data in addition to the actual horizon data and must take car in organizing it.

Many oil companies, geophysical service companies, universities, and research institutions have their own model building processes. The "layer" approach is common but "cell" or "polygon" models are also used.

An example of a commonly used modeling technique is illustrated in U.S. Pat. No. 4,679,174, "Method for Seismic Lithologic Modeling", issued to Valery A. Gelfand, which describes a method of seismic exploration of the subsurface of the earth. Seismic reflection data are gathered in a selected area. The seismic data are combined with available non-seismic data to define an initial two dimensional lithologic model. Based upon the initial model, a set of synthetic seismic data is generated. The degree of correspondence between the set o synthetic reflection data and the gathered seismic data is determined. The initial model-parameters are systematically perturbed during a series of interactions until a desired degree of correspondence has been achieved, resulting in a final lithologic model.

Other United States patents which relate to seismic data processing techniques that relate generally to modeling are as follows.

U.S. Pat. No. 4,415,999, "Method of Confirming Seismic Data Interpretation", issued to George P. Moeckel et al., describes a method of generating synthetic seismograms for use in determining the accuracy of hypothesized subterranean structures. The method features defining hypothesized detector location corresponding to real detector locations rather than interpolating from arbitrary detector locations generated by specifying of initial ray path angles as input data. The accuracy of the results is obtained with the elimination of interpolation.

U.S. Pat. No. 4,747,054, "Method for Non-Linear Signal Matching", issued to Chittibabu Chittineni, describes a process for non-linear matching of time analog signals, particularly seismic signals, that have generally similar response characteristics but different time bases. The process models the signals to be matched as a stretched version of each signal with additive noise, and a match curve is estimated adhering to a global criterion of maximization of the likelihood function. The global criterion is further optimized in accordance with the principle of path optimality and other important information may also be considered. The match curve may then be used to identify such as correlated signal events, comparison of signal sections, and numerous seismic data processing functions using multi-sensor time analog data input.

U.S. Pat. No. 4,766,574, "Method for Depth Imaging Multicomponent Seismic Data", issued to Norman D. Whitmore, Jr. et al., describes a method for imaging multicomponent seismic data to obtain depth images of the earth's subsurface geological structure as well as estimates of compressional and shear wave interval velocities. In particular, measures are obtained of imparted seismic wave fields incident on reflecting interfaces in the earth's subsurface and of resulting seismic wavefields scattered therefrom. The incident and scattered seismic wavefields are employed to produce time dependent reflectivity functions representative of the reflecting interfaces. By migrating the time dependent reflectivity functions, depth images of the reflecting interfaces can be obtained. For a dyadic set of multicomponent seismic data, the dyadic set of multicomponent seismic data are partitioned so as to separate the variously coupled incident and reflected wavefields in the recorded multicomponent seismic data. The incident and reflected wavefields are cross-correlated to form time dependent reflectivity functions. The time dependent reflectivity functions are then iteratively migrated according to a model of wavefield velocities of propagation to obtain estimates of the compressional and shear wave interval velocity. The migrated reflectivity functions can then be stacked to produce depth images of the earth's subsurface geological structures.

U.S. Pat. No. 4,821,242, "Depositional Reconstruction for Petroleum Location", issued to Willard M. Hennington, describes an exploration development technique for delineating hydrocarbon accumulations and prospect development. The technique uses existing information and establishes a relationship between present day subsurface structure and stratigraphic prehistoric reservoir development for determination and projection of relative reservoir development, definition and grading of combination structural-stratigraphic type traps, determination of permeability barriers, migration paths, accumulation areas, prospect grading, pressure cells and prediction of fluid movement. Depositional reconstruction results in a summary map which outlines productive areas, shows potential extensions, graded prospects, relative reservoir developments, and the other stratigraphic conditions which control the successful economic exploitation of a potential horizon.

However, all of the foregoing patents illustrate modeling methods that require the use of seismic data or processing techniques in order for their methods to be operative.

SUMMARY OF THE INVENTION

The present invention provides a simple and geologically logical method for creating a numerical model of the physical rock properties (e.g., velocity) within a two-dimensional slice of the earth. The present invention is a model building process, a method of translating a drawn or imagined model into a numerical format. In the method of the present invention the concept of cells is utilized. Cells are defined as the smallest areas enclosed by a series of digitized interfaces. The model will be split into a set of cells, polygons which fit tightly together leaving no gaps.

The present invention solves the problem of representing the modeled structure without the need for special rules. Even when an extremely complex structure is to be represented, the geoscientist is required only to enter his interpretation of the subsurface, picked horizons and faults, without manipulation to suit the model building process.

Its major advantages are that only the geological horizons and faults which exist in the physical model need be entered, dummy interfaces are never required, and information can be entered in any order. Provided the model makes geological sense, the model building process is transparent to the user. The input data is preconditioned which will even correct small digitizing errors such as horizons extending across faults.

Working from a paper sketch or interpreted seismic display, the geological horizons and faults are digitized in any order. If the horizon is unbroken, it is digitized continuously as one piece, this is known as a single element. If the horizon is broken by faulting, it is digitized as a series of elements. If the horizon terminates within the model, digitizing ceases at that point. The boundaries of the model are automatically added as another element. The first step in model building is to check the integrity of the input digitized data by preconditioning the digitized horizon and fault data. A search is performed to check that no elements cross, which is geologically implausible. If intersecting elements are found, the shortest limb is deleted. A second search locates elements which do not terminate at an intersection. If the element is from a horizon, it is projected until it intersects another element. In the case of an unconnected fault element, the element is deleted back to its first intersection point.

The process of constructing cells, the smallest areas which can be enclosed by a series of digitized segments, begins with a search through the connection records for segments which connect only to themselves. These closed structures are lenses within the geological structural model.

Tables are maintained of how often each segment has been used. To ensure there are no gaps in the model, all segments must be used twice in the model definition. Segments which are part of the model boundary are a special case a they will be used only once. These boundary segments are placed in the "used once" table. Cell building starts by selecting the segment at the top of the "used once" table. Segments are used to construct cell units in a clockwise direction. However, the process works equally well in the opposite direction. The angle made between the final pair of points in the active segment and the first two points in each of the connecting segments is calculated. The segment with the largest angle is chosen. By repeating this process of always selecting the segment which subtends the largest clockwise angle until the starting segment is again encountered, a closed polygon or cell can be defined and the segments used moved into the "used once" or "used twice" tables. Subsequent cell definitions also begin with the segment at the top of the "used once" table and build by the same selection process. When the "used once" selection table is empty, all cells in the model have been delineated.

Physical properties are assigned to each cell. If the properties are convoluted such as velocity changing through a cell with several horizontal gradients, then the cell is automatically split into micro-cells defining volumes of space where the velocity changes with a single gradient.

DESCRIPTION OF THE PREFERRED EMBODIMENT

The invention described here is a model building process, a method of translating a drawn or imagined model into a numerical format.

Creating a numerical model which represents the distribution of material properties, such as acoustic velocity, within the earth is the first step in many processes. Such models are most commonly used to determine the paths seismic rays would take through the earth, to calculate their travel times, to produce synthetic seismic sections and to invert seismic data by depth migration.

Some of the major advantages of the present invention are that only the geological horizons and faults which exist in the physical model need be entered, dummy interfaces are never required, and information can be entered in any order. Provided the model makes geological sense the model building process is transparent to the user. Preconditioning of the input data will even correct small digitizing errors such as horizons extending across faults.

Figure 1A:
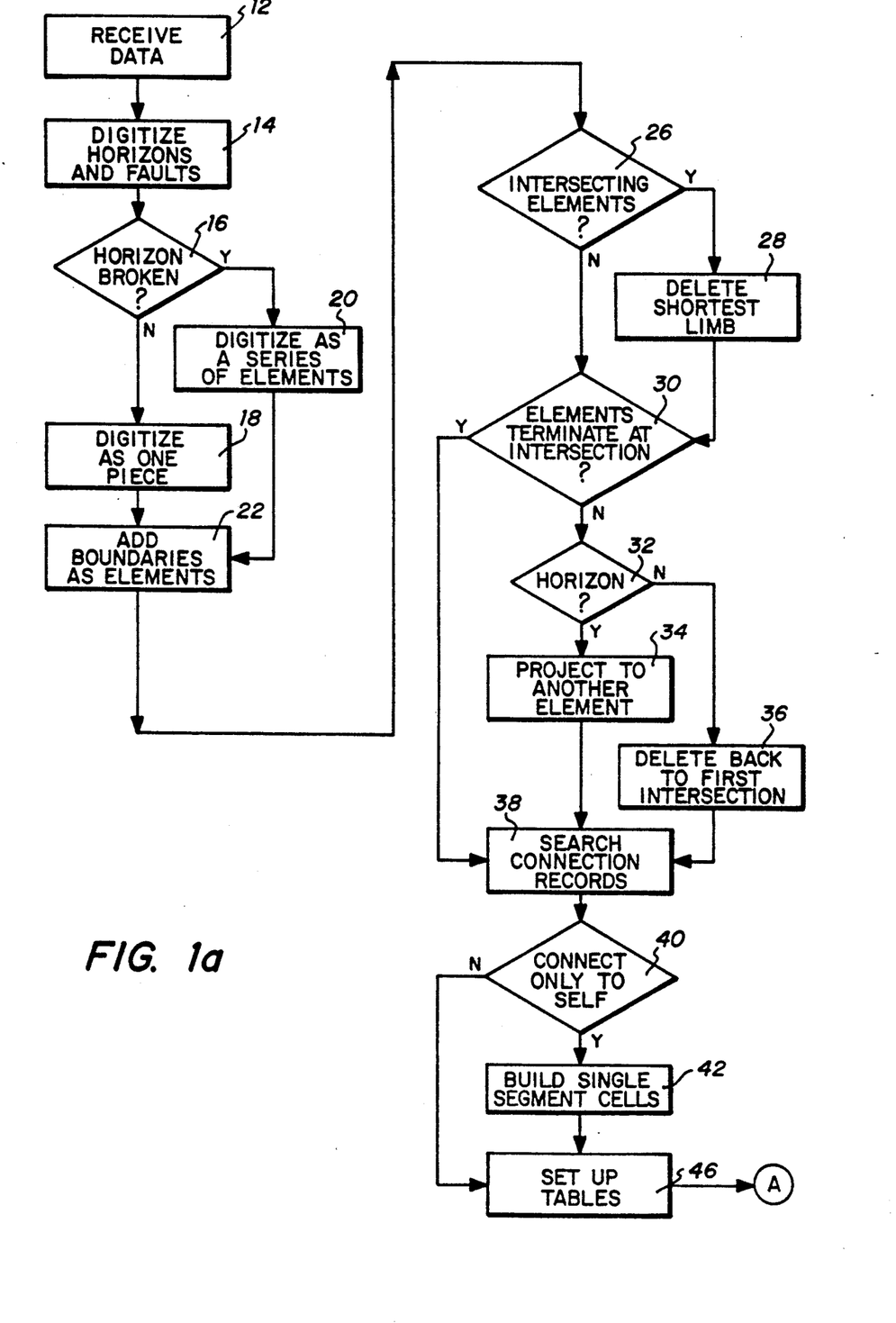
FIGS. 1a and 1b together form a block diagram illustrating the method of the present invention.
Figure 1B:
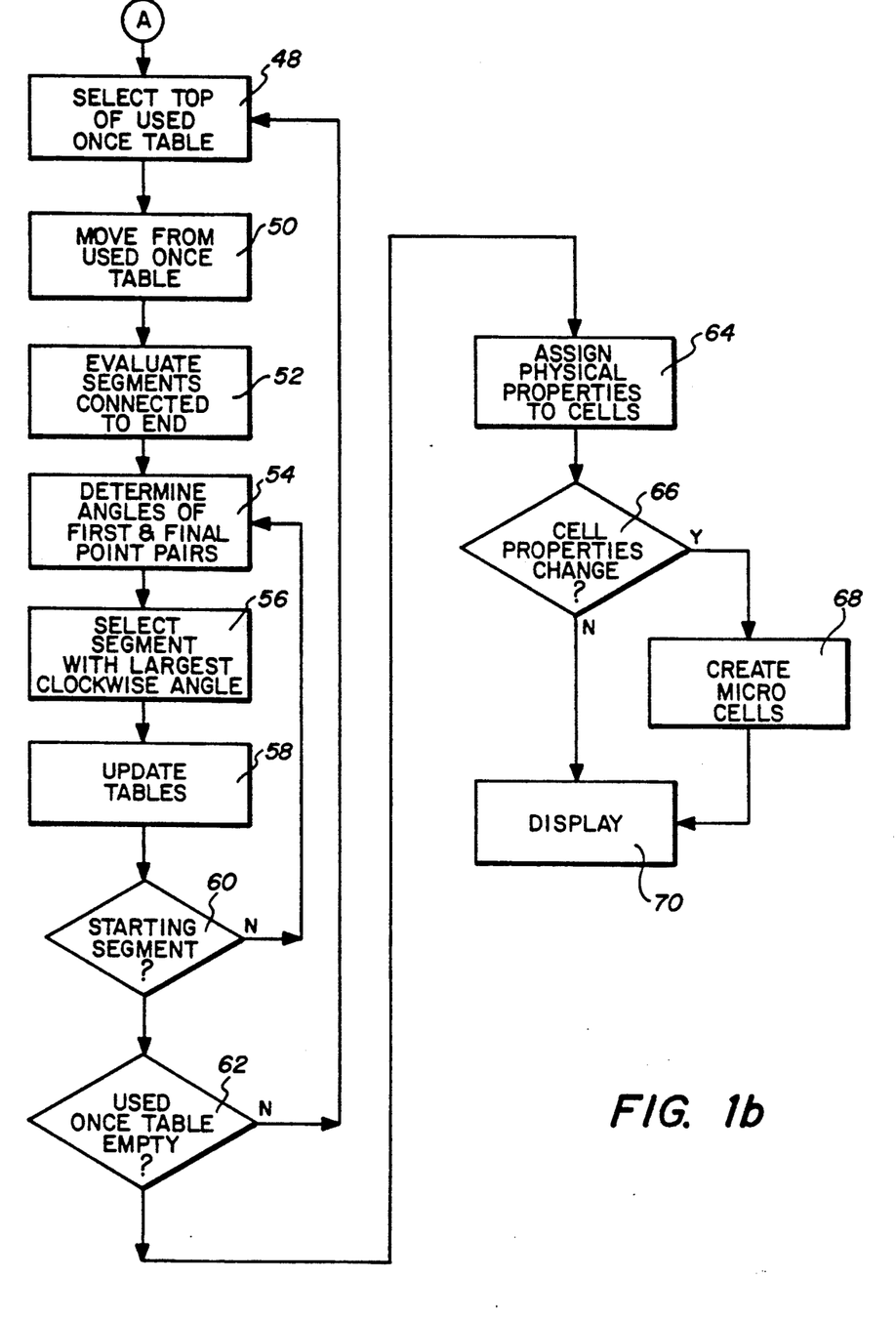

Referring now to FIGS. 1a and 1b, the general operation of the method of the present invention is illustrated in block form. In block 12 the information with which a model is to be made is received. This is the product of a geophysical interpretation of seismic data and may take almost any form, such as a paper sketch or interpreted seismic display, etc. This data may exist as a series of lines which represent the position of faults and geophysical horizons. Working from this information the geological horizons and faults are identified and digitized in any order at block 14. A determination of the horizons is made at block 16. Digitizing is the initial step of converting these drawn lines into a numerical representation. This operation may be performed by methods commonly used in the art. Once digitized, a horizon or fault is represented as a series or string of X,Y points. Each separate drawn line produces a separate string of points, each of which is one element. If the horizon is unbroken, it is digitized continuously as one piece at block 18. This is known as a single element. If the horizon is broken by faulting, it is digitized as a series of elements at block 20 (see FIG. 3). If the horizon terminates within the model, digitizing ceases at that point. A geological horizon or fault which has been drawn as several lines will therefore produce several strings of digitized points, each one of these strings is referred to as an element. The elements resulting from digitizing all horizons and faults are the numerical data necessary for the model building process.

Precise digitizing means that every digitized element should terminate on another without crossing it. This is a geological proviso, it is difficult to conceive of a case where a horizon does not terminate on another horizon (termination), on itself (a lens) or against a fault. It is not a requirement that digitizing be this accurate.

The first step in model building is to check the integrity of the input digitized data by preconditioning the digitized horizon and fault data. As the first step in preconditioning of the digitized elements, the boundaries of the model are added as two new elements at block 22. The limits of the model, minimum and maximum values of X and Y points, must be provided by the user. These limits are used to form the two extra elements, each with three points, that form the boundary of the model. At block 26 a determination is made as to whether any element crosses another. If intersecting elements are found, the shortest limb is deleted at block 28. The intersection point is now the end point in one element and also inserted into the definition of the continuous element. A second search at block 30 locates elements which do not terminate at an intersection with another element. A determination is made at block 32 if the element is from a horizon, and if it is, it is projected until it intersects another element at block 34 and this point is added to both elements. In the case of an unconnected fault element, the element is deleted back to its first intersection point at block 36. This procedure is not designed to correct major flaws in the input data, just small defects common in digitized line data. After preconditioning, elements have been extended or truncated so that they all start and end with intersection points.

Figure 2:
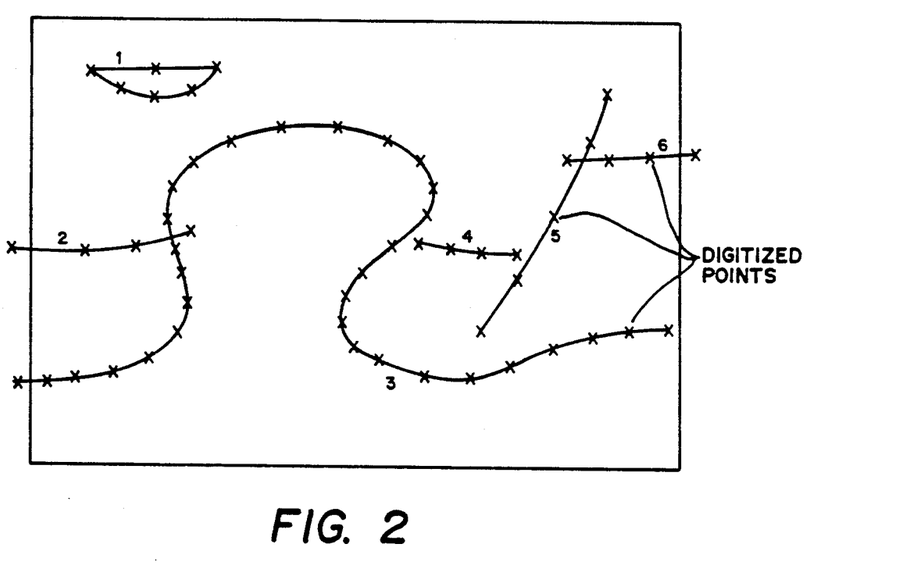
FIG. 2 is a graphical representation illustrating continuous strings of digitized points.
Figure 3:
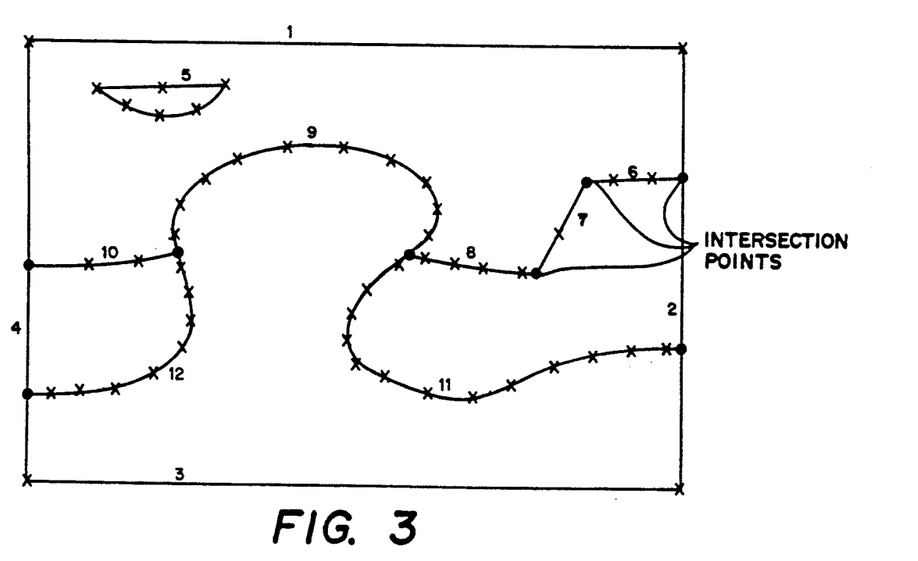
FIG. 3 is a graphical representation illustrating the addition of model boundaries to the digitized data and termination of segments at an intersection with another segment.

All of the intersection points within the model are known, they have the property of occurring at least twice in the digitized data set. Each element starts and ends at an intersection point and may have several more along its length where other elements terminate against it. The portion of an element between adjacent intersection points is known as a segment. For example, in the model in FIG. 2 the lowest digitized horizon was input as one element. After preconditioning, as illustrated in FIG. 3, it has been split into three segments.

The construction of the model as being a set of cells may now begin. Cells are the smallest areas which can be enclosed by a series of digitized segments. Within each cell, the physical parameters vary in a consistent manner. In effect, the digitized elements are used to cut the model into a jigsaw, all the pieces/cells fitting together, leaving no gaps.

During the preconditioning, all the intersection points within the input data have been identified and used to split the digitized elements into a series of segments. Segments only meet at their end points and a record is maintained of which segments connect to which.

At block 38 the process of constructing cells from segments begins with a search through the connection records for all segments which connect only to themselves. These are a special category of cells which are bounded by single segment. These closed structures, identified at block 40, are unconnected lenses within the geological structural model. At block 42 all selected segments are built into single segment cells. These segments which connect only to themselves are identified during the preconditioning operations and so are available to form the first cells. When all segments that connect to themselves have been identified, tables of use are set up at block 46.

Cells are defined by the segments which form their border. The cell building operation is controlled by tables which record how often each segment has appeared in the cell definitions. Tables are maintained of how often each segment has been used. Segments which are part of the model boundary are a special case as they will only be used once. These boundary segments are placed in the "used once" table. A property of the remaining segments is that since each segment is the boundary between two cells they must appear twice in the cell definitions.

Each future step in the cell building starts with selecting the segment at the top of the "used once" table. This segment is placed in the cell definition and also moved to appear in the "used twice" table.

At block 48 the top or first segment in the used once table is selected. At block 50 the selected segment is moved to a used twice table while the segments connected to the end of the selected segment are evaluated at block 52.

A choice must now be made, the segments connected to the end of the first segment are known but which belongs to the cell under construction? Some sense of direction is needed for this decision. The angle made between the final pair of points in the active segment and the first two points in each of the connecting segments is calculated in a clockwise sense. When building a clockwise cell, the segment with the largest angle should be chosen. This segment now becomes active, is added to the cell definition, and placed in the "used once" or "used twice" tables as appropriate.

At block 54 the angle between the active segment and the connecting segments are compared. The segment that defines the largest clockwise angle is selected and added to the cell definition at block 56.

At block 58 the use tables are updated. At block 60 a check is performed to determine whether the last segment added to the cell is also the starting segment. If this is the case, the cell has been completed, if not, another segment must be chosen.

By repeating this process of always selecting the segment which subtends the largest clockwise angle until the starting segment is again encountered, a closed polygon or cell can be defined and the segments moved into the "used once" or "used twice" tables.

Figure 4:
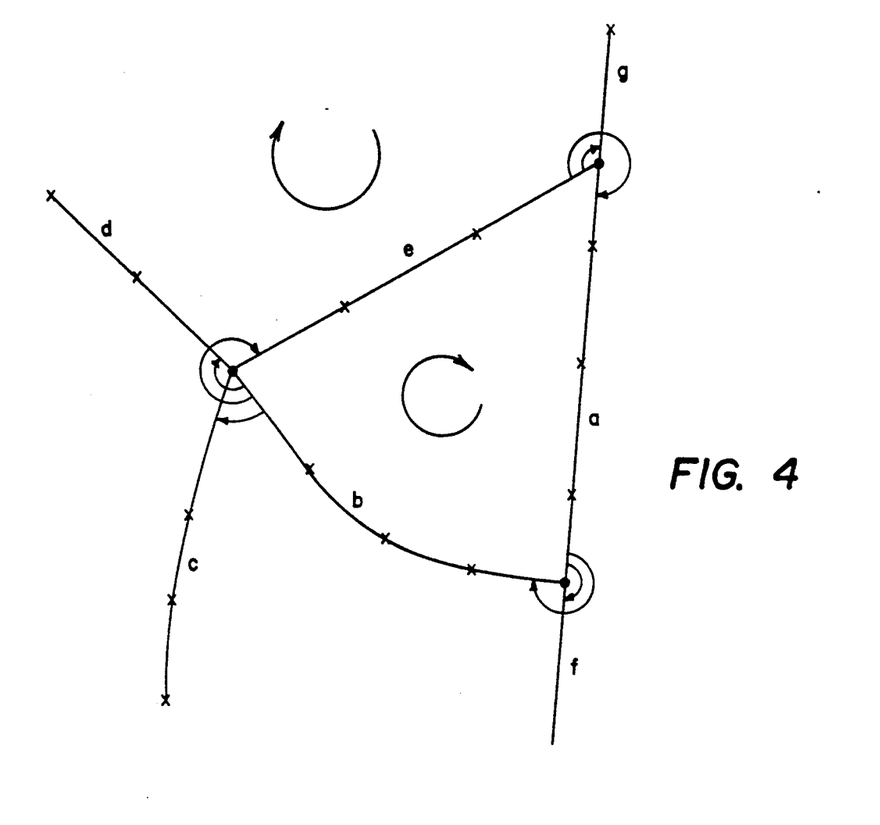
FIG. 4 is a graphical representation illustrating the building of a cell in a clockwise manner.

For example, in FIG. 4 segment a is selected to start building a cell. Segment a links to segments b and f. Segment b has the largest clockwise angle. Segment b links to segments c, d and e. Segment e has the largest clockwise angle. Segment e links to segments a and g. Segment a has the largest angle and it closes the cell. As a result, cell 1 is defined by segments a, b and e.

After each cell is completed a determination is made whether the used once table is empty at block 62. If the used once table still has segments in it the program returns to block 48 to select the top or first entry in the used once table. Subsequent cell definitions also begin by selecting the segment at the top of the "used once" table. When this table is empty, then all cells in the model have been delineated. A check can be performed by ensuring all segments now appear in the "used twice" table.

Each cell definition begins with the segment at the top of the "used once" table and tries to build in the direction t is segment was digitized. Originally, the "used once" table will only contain segments from the model boundary. This boundary data was added to the digitized elements during preconditioning and its points are always in a clockwise sense. Consequently, all cells containing a boundary segment will have the property of being in a clockwise direction. As cell building proceeds and internal segments are placed in the "used once" table, a record is also kept of their direction of use, forward or reverse to the order of digitized points. When one of these segments is selected to start off a cell, it is used in the direction opposite to its previous use. This check on the first segment in a cell definition ensures that all cells are built in the same clockwise fashion.

If all segments have been used the process proceeds to block 64 where the final step in model creation is to assign physical properties to each cell. Doing this independently for each cell could be tedious if there are several cells all from the same geological unit, or the same rock type that have the same properties. Instead, each cell is given a material identifier code and the physical properties of this material type defined only once. In this way, many cells can share the same properties. This also makes editing of the numerical model easier.

If the properties are convoluted such as velocity changing across the model with several horizontal gradients, then the cells are automatically split into microcells defining volumes of space where the velocity changes with a single gradient.

At block 66 a determination is made whether properties change within the cell. If they do, micro-cells are created at block 68. If they do not, a display of the mathematical model is provided at block 70.

Figure 5:
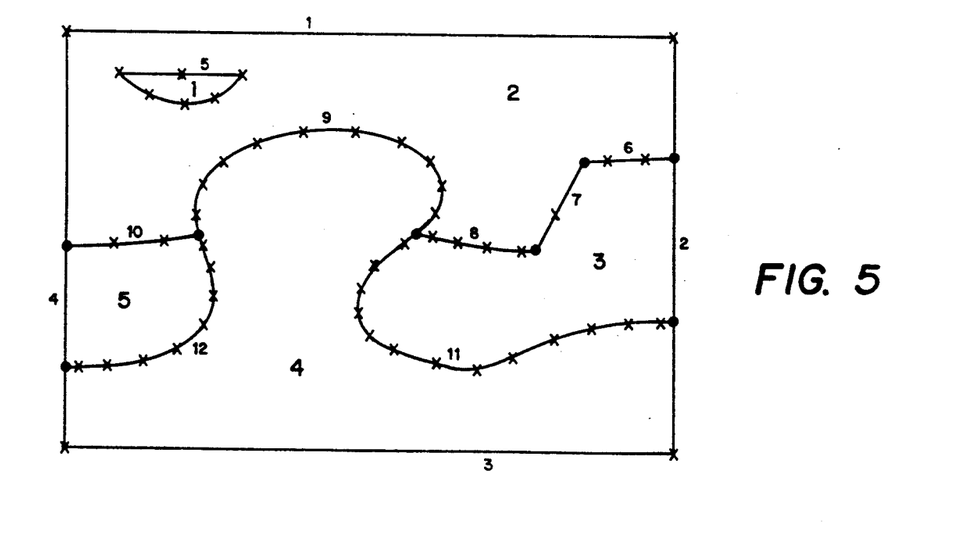
FIG. 5 is a graphical representation illustrating the final cell definitions.

This method for identifying cells within a digitized model is elegant and very robust. FIG. 5 is an illustration of the final model that is obtained using the method of the present invention. The model illustrated has twelve segments which define five cells. The first cell, cell 1, is made up by one segment, segment 5. Cell 2 is made up of segments 1, 6, 7, 8, 9 and 10 in this order. Cell 3 is defined by segments 2, 11, 8, 7 and 6. Cell 4 is defined by segments 3, 12, 9 and 11. Cell 5 is defined by segments 4, 10 and 12.

There is the opportunity for many internal error checks and tests that the operation is successful.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method of translating a two dimensional drawn or imagined model of the earth's physical properties into a numerical format for use in computer calculations comprising the steps of:

receiving seismic data;

digitizing geological horizons and faults to produce strings of digitized points wherein each string of digitized points is an element;

digitizing said horizons as a single element when said horizon is unbroken, and digitizing said horizons as a series of said elements when said horizon is broken by faulting;

preconditioning said digitized elements by checking the integrity of said digitized data and dividing elements containing intersection points along their length into segments which only contain two intersection points;

using said segments to construct cell units in a clockwise direction; and assigning physical properties to each of said cell units.

2. The method according to claim 1 wherein said step of receiving seismic data includes the step of:

obtaining an interpreted seismic display.

3. The method according to claim 1 wherein said step of digitizing said horizons and faults includes the steps of:

discontinuing digitizing a selected horizon whenever said selected horizon terminates within the model.

4. The method according to claim 1 wherein said step of preconditioning said digitized elements includes the steps of:

adding boundaries of the model as another element.

5. The method according to claim 1 wherein said step of preconditioning said digitized elements includes the steps of:

performing a search to locate intersecting elements; and deleting the shortest limb of said intersecting elements whenever said intersecting elements are located..

6. The method according to claim 5 wherein said step of preconditioning said digitized elements includes the steps of:

performing a second search to locate elements which do not terminate at an intersection;

projecting said element which does not terminate at an intersection until said element intersects another element whenever said element is from a horizon; and deleting said element back to its first intersection point whenever said element is an unconnected fault element.

7. The method according to claim 1 wherein said step of preconditioning said digitized elements includes the steps of:

identifying segments which connect only to themselves as single segment cells.

8. The method according to claim 1 wherein said step of using said segments to construct cell units includes the steps of:

selecting a segment as a starting segment;

determining the angle made between a final pair of points on said starting segment and the first two points on all connecting segments; and selecting said connecting segment with the largest angle.

9. The method according to claim 1 wherein said step of assigning physical properties to each of said cell units includes the step of:

splitting said cell units into micro-cells defining volumes of space within which physical properties vary in a predictable manner.

10. A method of translating a two dimensional drawn or imagined model of the earth's physical properties into a numerical format for use in computer calculations comprising the steps of:

receiving seismic data by obtaining an interpreted seismic display;

digitizing geological horizons and faults to produce strings of digitized points wherein each string of digitized points is an element;

digitizing a selected horizon as a single element when said horizon is unbroken, and digitizing said selected horizon as a series of said elements when said horizon is broken by faulting, discontinuing digitizing said selected horizon whenever said selected horizon terminates within the model, adding boundaries of the model as another element, performing a search to locate intersecting elements and deleting the shortest limb of said intersecting elements whenever said intersecting elements are located, performing a second search to locate elements which do not terminate at an intersection, projecting said element which does not terminate at an intersection until said element intersects another element whenever said element is from a horizon and deleting said element back to its first intersection point whenever said element is an unconnected fault element, dividing elements containing intersection points along their length into segments which only contain two intersection points, and identifying segments which connect only to themselves as single segment cells;

using said segments to construct cell units in a clockwise direction by selecting a segment as a starting point, determining the angle made between a final pair of points of said selected segment and the first two points of all connecting segments and selecting said connecting segment with the largest angle; and assigning physical properties to each of said cell units and splitting said cell units into micro-cells defining volumes of space with simple properties when the properties of said each of said cell units are convoluted.

11. A method for creating a numerical model of the physical properties within the earth from input data including an interpreted seismic display comprising the steps of:

digitizing geological horizons and faults to produce strings of digitized points wherein each string of digitized points is an element;

digitizing said horizons as a single element when said horizon is unbroken, and digitizing said horizons into a series of elements when said horizon is broken by faulting;

performing a search to locate intersecting elements;

deleting the shortest limb of said intersecting elements whenever said intersecting elements are located;

performing a second search to locate elements which do not terminate at an intersection;

projecting said element which does not terminate at an intersection until said element intersects another element whenever said element is from a horizon;

deleting said element back to its first intersection point whenever said element is an unconnected fault element;

dividing elements containing intersection points along their length into segments which only contain two intersection points;

adding boundaries of the model as another element; and creating cells from said digitized elements by selecting a segment as a starting segment and determining the angle made between a final pair of points of said selected segment and the first two points of all connecting segments and selecting the segment with the largest angle.

12. The method according to claim 11 wherein the step of digitizing geological horizons and faults includes the steps of:

discontinuing digitizing a selected horizon whenever said selected horizon terminates within the model.

13. The method according to claim 11 wherein the step of creating cells includes the step of:

identifying segments which connect only to themselves as cells.

14. The method according to claim 11 wherein said step of creating cells includes the step of:

assigning physical properties to each of said cells.

15. The method according to claim 14 wherein said step of assigning physical properties to each of said cells includes the step of:

splitting said cells into micro-cells defining volumes of space where properties vary in a simple manner when the properties of each of said cells are convoluted.

* * * * *

UNITED STATES PATENT AND TRADEMARK OFFICE
CERTIFICATE OF CORRECTION

PATENT NO. : 5,229,976
DATED : July 20, 1993
INVENTOR(S) : Mark Boyd and Douglas W. Hanson It is certified that error appears in the above-identified patent and that said Letters Patent is hereby corrected as shown below:

Column 1, line 30, a period needs to be inserted after "invention".

Column 1, line 37, "car" should be --care--.

Column 3, line 58, the word "a" should be --as--.

Column 7, line 10, "direction t is segment" should be --direction this segment--.

Signed and Sealed this

Twenty-second Day of March, 1994

Attest:

BRUCE LEHMAN

Attesting Officer     Commissioner of Patents and Trademarks